United States Patent [19]
Fitié

[11] Patent Number: 6,136,368
[45] Date of Patent: Oct. 24, 2000

[54] USE AS FEED FOR CRUSTACEANS OF A RESIDUE IN THE DISTILLATION OF CRUDE FATTY ACIDS AS WELL AS THE USE OF THIS RESIDUE FOR THE MANUFACTURE OF FEED FOR CRUSTACEANS

[75] Inventor: Albertus Filippus Fitié, Almkerk, Netherlands

[73] Assignee: Croy Association B.V., Aarle-Bixtel, Netherlands

[21] Appl. No.: 09/274,170

[22] Filed: Mar. 23, 1999

[30] Foreign Application Priority Data

Mar. 24, 1998 [NL] Netherlands ............................. 1008684

[51] Int. Cl.[7] ....................................................... A23J 7/00
[52] U.S. Cl. ........................... 426/662; 426/656; 426/805
[58] Field of Search .................................... 426/662, 805, 426/656

[56] References Cited

U.S. PATENT DOCUMENTS 3,939,285 2/1976 Garrett, Sr. et al. ..................... 426/285
5,091,117 2/1992 Athnasios et al. ....................... 260/428
5,773,051 6/1998 Kim ............................................ 426/1

OTHER PUBLICATIONS

Hartfiel et al., Fett. Wiss. Technol., vol. 91(4), pp. 154–158, 1989.

Bernard Devresse "Shrimp Feed Formulation", Feed Milling International, Sep. 1996, pp. 24–26.

Primary Examiner—Chhaya D. Sayala
Attorney, Agent, or Firm—Milde, Hoffberg & Macklin, LLP

[57] ABSTRACT

A residue in the distillation of crude fatty acids is used as a food for crustaceans. The fatty acids utilized in the distillation are obtained from hydrolysis of natural, chiefly animal, fats. Sterols have a higher boiling point than the fatty acids and are therefore not distilled. This gives the residue a much higher cholesterol content than the fatty acids and makes it eminently suitable as feed for crustaceans. The residue can be used directly as feed for crustaceans or first a carrier of protein and/or silicate can be added to the residue, with preferably lecithin also being added to the residue.

5 Claims, 2 Drawing Sheets

USE AS FEED FOR CRUSTACEANS OF A RESIDUE IN THE DISTILLATION OF CRUDE FATTY ACIDS AS WELL AS THE USE OF THIS RESIDUE FOR THE MANUFACTURE OF FEED FOR CRUSTACEANS

BACKGROUND OF THE INVENTION

1. Field of the Invention

The invention lies in the field of feed for cultivating crustaceans. In the aquaculture of crustaceans these animals are usually stocked at a high density, as a result of which the amount of natural feed available is not sufficient to support good growth. For this reason it is necessary to increase the production of natural feed by means of fertilisation and/or by adding artificial feed for the crustaceans. The latter forms the field of the present invention.

It is known that sterols are essential components of feed for crustaceans. A known problem in the cultivation of crustaceans is that these animals are unable to synthesise sterols. For this reason sterols form essential nutrients for the growth, development and survival of crustaceans. It is also known that with regard to sterols, cholesterol is the most effective.

2. Prior Art

Some cholesterol-rich feed ingredients for adding to feed for crustaceans are known such as various fish meals and fish oils, see Feed Milling International, September 1996, pages 24–26. These ingredients are added to feed for crustaceans. A disadvantage of the known feed ingredients is that they are relatively expensive. In addition, such natural cholesterol sources as fish meal and fish oil are not rich in cholesterol, so that the formulator of the feed for crustaceans requires great quantities of these ingredients in order to acquire the desired quantity of cholesterol in the feed (0.2–0.4%). This makes the production of the feed expensive and the formulator cannot make use of inexpensive vegetable proteins.

It is also known to use chromatography to extract a purified cholesterol product from sheep wool fat. A significant disadvantage of this, however, is that this product is very expensive.

SUMMARY OF THE INVENTION

An objective of the invention is to acquire a cholesterol-rich feed for the cultivation of crustaceans that is less expensive than the known feeds. In the present invention this objective is realised by using a residue in the distillation of crude fatty acids as feed for crustaceans, with these fatty acids being obtained from the hydrolysis of natural, mostly animal, fats. Sterols have a higher boiling point than the fatty acids, so they are not distilled. So the residue has a much higher cholesterol content than the fatty acids, making it eminently suitable as feed for crustaceans. In addition, the residue is much less expensive than known cholesterol-rich products, indeed up to ten times more economical.

Attempts have already been made to put together an animal feed that can replace fish meal in poultry and pig feeds. Thus far the use of these fish meal analogues has been unsuccessful in feeds for crustaceans. Most of these analogue feeds yielded poor results in the cultivation of crustaceans because the manufacturers focused virtually exclusively on proteins and not on essential fats. A fish meal analogue for crustaceans that does meet requirements, however, was obtained by an embodiment of the use of the residue according to the invention that is characterised by the fact that a protein and/or silicate carrier is added to the residue plus, preferably, sterols as well, for example soy lecithin. The fish meal analogue for crustaceans is therefore a mixture of inexpensive proteins with lecithin, the residue and silicates being carriers for the fat component.

The invention also applies to the use of the specified residue for the manufacture of feed for crustaceans.

BRIEF DESCRIPTION OF THE DRAWINGS

The invention will be elucidated more fully below by means of drawings along with descriptions of the production process of the residue for use as feed for crustaceans and for the manufacture of feed for crustaceans. In these drawings.

DETAILED DESCRIPTION OF THE DRAWINGS

Figure 1:
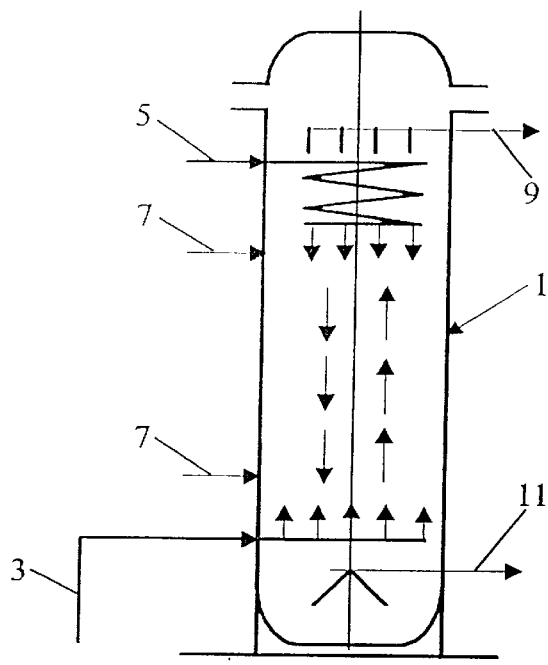
FIG. 1 diagrammatically illustrates a hydrolysis process for the production of crude fatty acids from natural oil or fat.

FIG. 1 diagrammatically shows a hydrolysis process in which crude fatty acids are produced from natural fats and oils. In order to end up after distillation with a residue that is suitable as a feed for crustaceans, for the hydrolysis process preferably animal fat or a fat with the highest possible content of animal fat should be used. The reason for this is that animal fat contains cholesterol, in contrast to vegetable fat that contains no cholesterol and that should therefore be present only in the smallest possible amount. Amongst other things the fat of cattle, pigs, poultry, sheep, or fish oil can be used as animal fat. This animal fat can originate, for example, from slaughterhouses.

The hydrolysis process takes place in a hydrolysis tower 1. The fats 3 are placed in the hydrolysis tower 1 in which water 5 and steam 7 are added as the correct pressure and temperature are regulated. Here the fats 3 are converted into crude fatty acids 9 and glycerine 11.

Figure 2:
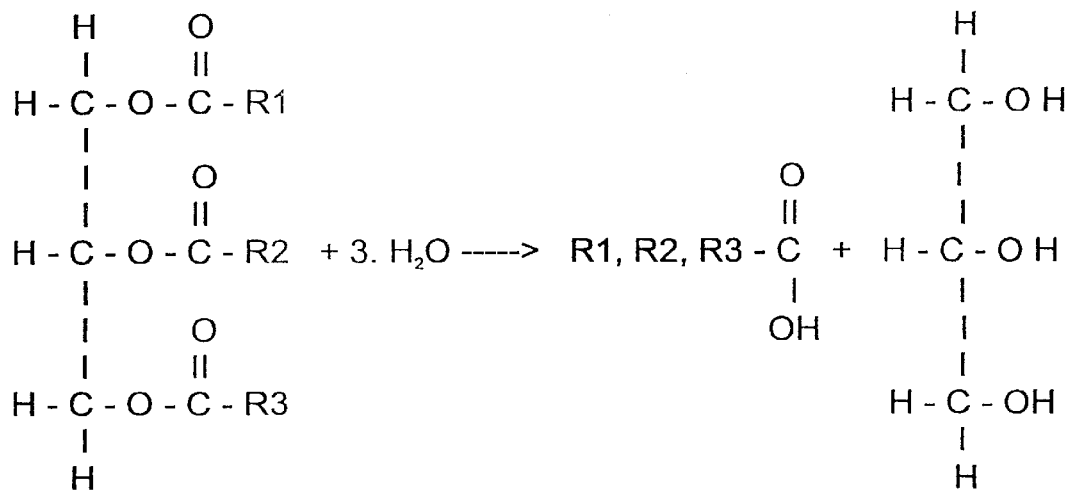
FIG. 2 shows the hydrolysis process in chemical formulas.

Animal fat consists predominantly of triglycerides (the formula to the far left in FIG. 2). In the hydrolysis process these react with water into mixed fatty acids and glycerine (the formula to the far right in FIG. 2). R1, R2, and R3 form fatty chains (linear hydrocarbon chains).

Figure 3:
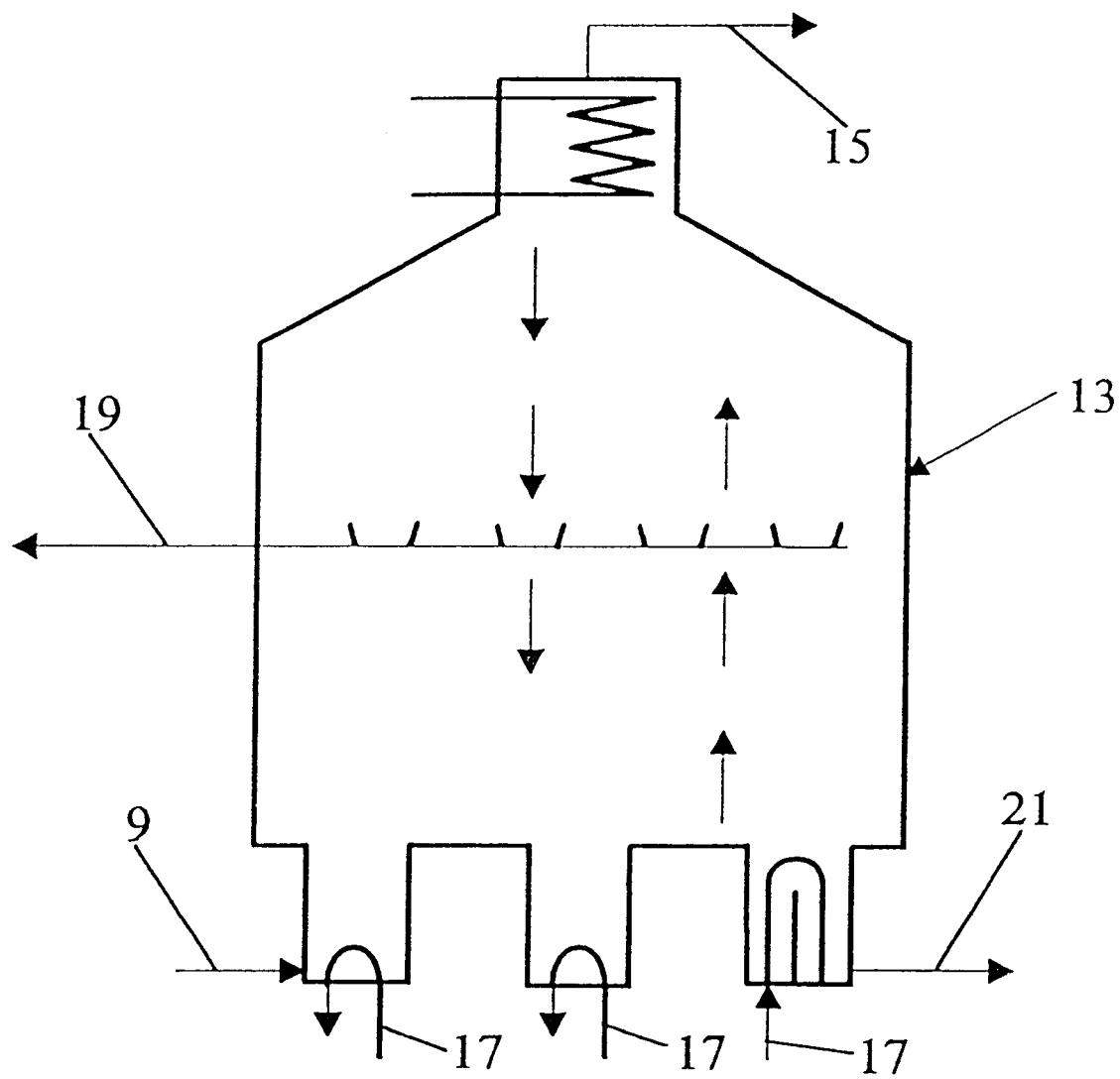
FIG. 3 diagrammatically shows a distillation process for crude fatty acids in which the residue is formed as a by-product.

Then the crude fatty acids 9, at the proper pressure and temperature, are distilled in a distillation column 13, see FIG. 3. The distillation column 13 is vacuum suctioned 15 and steam 17 is injected into the distillation column 13. The distilled fatty acids 19 are then hydrogenated in order to improve their stability and quality and are processed into, for example, soaps and chemicals.

Between 5 and 10% of the fat cannot be distilled, because it has a higher boiling point than the rest, and it forms the residue 21 that is used according to the invention as a feed for crustaceans. This residue 21 is called "pitch" and contains many sterols that have a higher boiling point than fatty acids and are part of the reason why the residue cannot be distilled. The pitch contains a number of substances that are not clearly defined, such as free fatty acids, polymerised fatty acids, sterols (vitamin E, cholesterol and other sterols), impurities, etc. The polymerised fatty acids and impurities give the pitch its typical black colour.

If, as an example, we proceed on the basis of an original content of 0.3% cholesterol in animal fat and a distillation in which 5% residue remains, a pitch is obtained with a cholesterol content of 20 times the original cholesterol content, that is to say 6%. The eventual cholesterol content depends on the fat that is used as a basic material (fish oil, for example, contains 2 to 3 times more cholesterol than the fat of cattle) and the efficiency of the distillation. The more efficient the distillation the higher the cholesterol content will be.

The pitch can also be a residue of a distillation of a mixture of vegetable and animal fat. The cholesterol content is then lower, approximately 2%, and contains phytosterols, which indicate the use of vegetable fats. Every pitch with a cholesterol content of approximately 1% or more can be economically used as a feed for crustaceans.

The pitch as such can be sold as feed for crustaceans in 200 l drums or 1000 l containers. The pitch can also be a part of a formulated product as a fish meal analogue for crustaceans. The pitch is then a part of a mixture of inexpensive proteins with lecithin and silicates as carriers for the fat component.

The availability of an inexpensive cholesterol source, such as pitch, can change the way in which feed compositions for crustaceans are calculated. The formulator does not require any expensive ingredients that are difficult to obtain, such as the specified known ingredients. In addition, the fish meal content in the feed can be decreased and a higher content of vegetable protein can be added, for example through the addition of soy or rapeseed. The result of this can be a less expensive feed formula that is less dependent on expensive non-conventional ingredients.

There has thus been shown and described a novel use as feed for crustaceans of a residue in the distillation of crude fatty acids, as well as the use of this residue for the manufacture of feed for crustaceans which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method of producing a food for crustaceans comprising the step of distilling crude fatty acids obtained in the hydrolysis of natural fats, including animal fats, to produce a residue.

2. The method according to claim 1, wherein a carrier selected from protein and silicate is added to the residue.

3. The method according to claim 1, wherein at least one sterol is added to the residue.

4. The method according to claim 1, wherein said at least one sterol includes soy lecithin.

5. The method according to claim 1, wherein the natural fats are primarily animal fats.

* * * * *